United States Patent [19]

Libkie et al.

[11] 3,853,298
[45] Dec. 10, 1974

[54] ENERGY ABSORBING SEAT ADJUSTER
[75] Inventors: Herbert A. Libkie, Marlette; Norbert T. Okoniewski, Utica, both of Mich.
[73] Assignee: General Motors Corporation, Detroit, Mich.
[22] Filed: June 11, 1973
[21] Appl. No.: 368,606

[52] U.S. Cl. ............... 248/429, 188/1 C, 296/65 A, 297/386
[51] Int. Cl. ............................................ B60r 21/10
[58] Field of Search ................... 248/429, 430, 420; 297/216, 386; 188/1 C; 296/65 A; 280/150 B

[56] References Cited
UNITED STATES PATENTS
| | | | |
|---|---|---|---|
| 1,964,405 | 6/1934 | Nenne | 248/429 |
| 3,189,313 | 6/1965 | Burns et al. | 248/429 |
| 3,578,376 | 5/1971 | Hasegawa et al. | 296/65 A |
| 3,696,891 | 10/1972 | Poe | 188/1 C |

FOREIGN PATENTS OR APPLICATIONS
| | | | |
|---|---|---|---|
| 528,799 | 11/1940 | Great Britain | 248/429 |
| 1,211,230 | 11/1970 | Great Britain | 248/429 |

Primary Examiner—Marion Parsons, Jr.
Attorney, Agent, or Firm—Herbert Furman

[57] ABSTRACT

A vehicle seat adjuster includes a first track member attached to the seat and a second track member attached to the vehicle body. The track members are slidably interengaged to permit longitudinal movement therebetween whereby the seat may be adjusted fore and aft. A friction shoe mounted on one of the tracks is vertically movable into frictional engagement with the other. An operating lever is attached to a cam which permits the seat occupant to move the friction shoe to selectively lock and unlock the seat for fore and aft adjusting movement. The force of kinetic impact energy overcomes the frictional engagement of the friction shoe against the other track of the seat adjuster to permit energy absorbing movement of the seat.

1 Claim, 4 Drawing Figures

PATENTED DEC 10 1974　　　　　　　　　　　　　　　　　3,853,298

ENERGY ABSORBING SEAT ADJUSTER

The invention relates to a seat adjuster and more particularly to a seat adjuster having a friction device acting between the seat and the vehicle body.

It is known to mount a seat and a motor vehicle by tracks which permit fore and aft movement of the seat.

It is also known to provide an energy absorber between the vehicle body and the seat to permit energy absorbing movement of a seat during impact situations.

According to the present invention first and second track members movable longitudinally relative one another are attached respectively to the vehicle seat and the floor pan of the vehicle body. A friction shoe is movably mounted on one of the track members and is movable into engagement with the other track member. An occupant actuatable cam forces the friction shoe into engagement of the other track to lock the seat from movement relative the vehicle body. The cam is operable to release the friction shoe to permit fore and aft adjusting movement of the seat. The frictional engagement of the friction shoe against the track may be overcome by kinetic impact energy to permit energy absorbing movement of the seat relative the body during impact situations.

Figure 1:
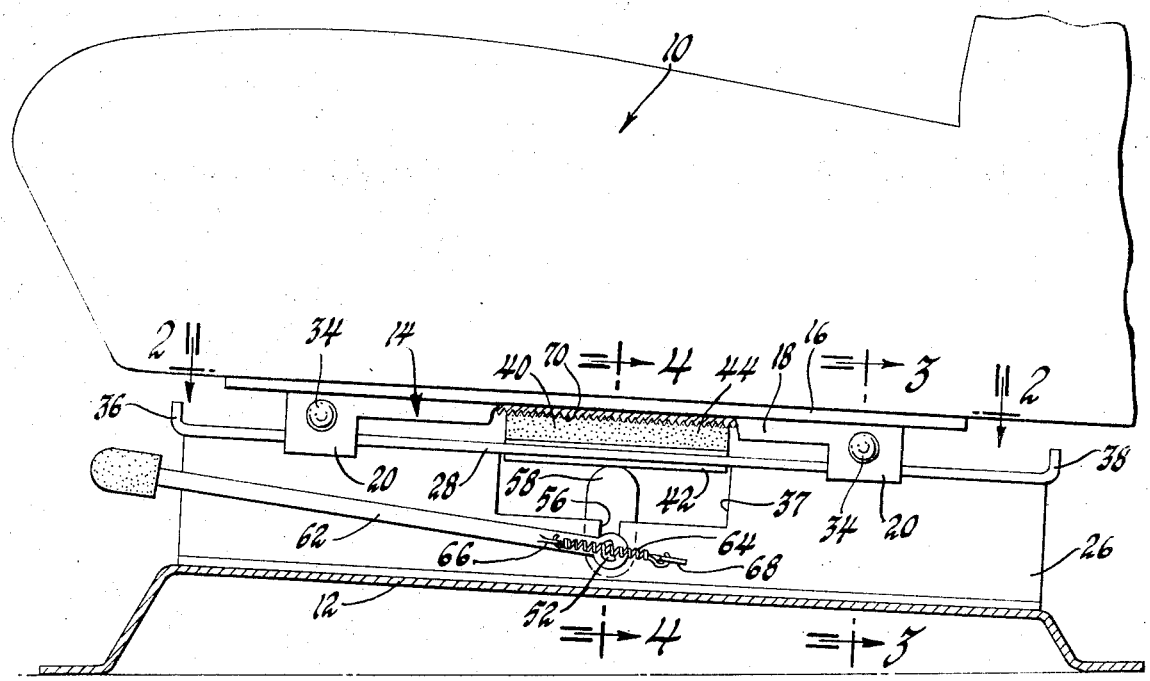
FIG. 1 is a side elevation view of a vehicle seat adjuster embodying the invention.

Referring to FIG. 1 it will be seen that a vehicle seat, indicated generally at 10, is mounted on the floor pan 12 of the vehicle body by an energy absorbing seat adjuster, indicated generally at 14.

Figure 3:
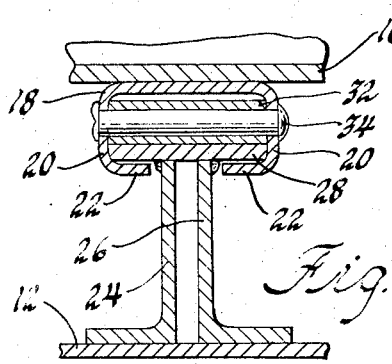
FIG. 3 is a sectional view taken in the direction of arrows 3—3 of FIG. 1.

The seat 10 includes a base plate 16 having a longitudinally extending, downwardly opening, channel-shaped, upper track 18 attached thereto. As best seen in FIGS. 1 and 3, the rear end of the upper track 18 has downwardly extending laterally spaced legs 20 which have inwardly extending flanges 22. The forward end of the track has similar and like numbered downwardly extending legs and inwardly extending flanges.

As best seen in FIG. 3, a second or lower track is attached to the vehicle floor pan 12 and includes laterally spaced angle members 24 and 26 having a plate 28 connecting the top of their upstanding legs and welded thereto. The upper track 18 is mounted for fore and aft movement on the plate 28 of the lower track by rollers 32 extending between the downwardly extending legs 20 of the upper track 18 and rotatably mounted therein by staked-end pins 34. The inwardly extending flanges 22 of the upper track 18 extend beneath the plate 28 of the lower track so that the plate 28 is captured between the flanges 22 and the rollers 32. Thus it will be seen that the upper and lower tracks are interengaged for relative longitudinal movement so that vehicle seat 10 may be easily adjusted fore and aft. The fore and aft ends of the plate 28 may be upturned as at 36 and 38 to limit such adjusting movement of the seat 10.

Figure 2:
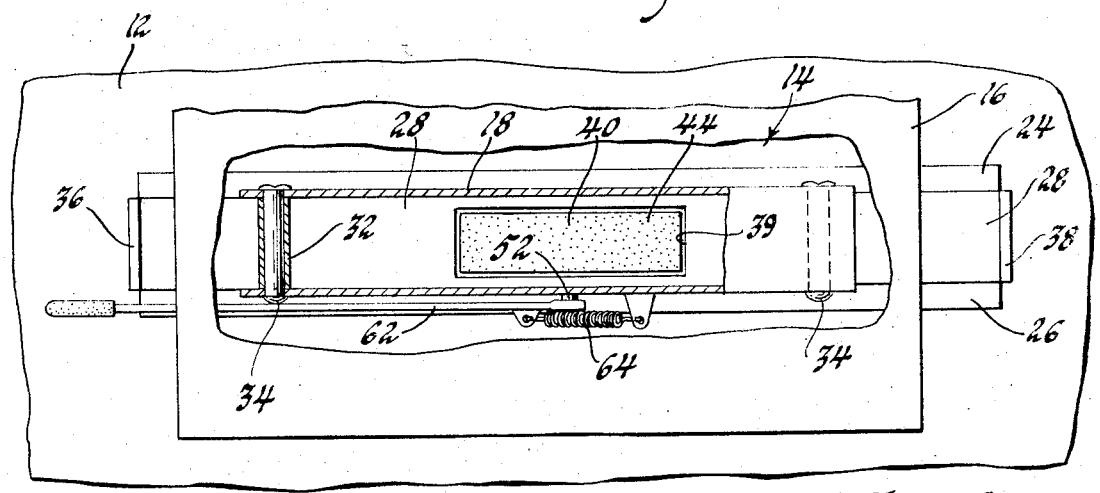
FIG. 2 is a plan view taken in the direction of arrows 2—2 of FIG. 1 and having parts broken away and in section.
Figure 4:
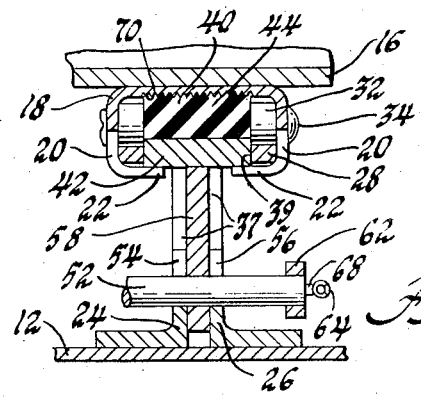
FIG. 4 is a sectional view taken in the direction of arrows 4—4 of FIG. 1.

A friction type lock and energy absorber is provided between the upper and lower tracks. The angle members 24 and 26 have aligned rectangular cut-outs 37 in their upstanding legs, as best seen in FIG. 1. Plate 28 has a rectangular cut-out 39, as best seen in FIGS. 2 and 4, opening to the cut-outs 37. A friction shoe 40, including a backing plate 42 and a friction lining 44, is vertically movable within the cut-outs 37 and 39 which limit fore and aft as well as transverse movement of the friction shoe. A shaft 52 is pivotally received in slots 54 and 56 of the upstanding legs of angle members 24 and 26 and has a cam 58 attached thereto. An operating lever 62 attached to the end of shaft 52 is operated by the seat occupant to rotate the cam 58. The cam 58 is shown in the drawing in position to force the friction shoe 40 vertically upwardly to force the friction lining 44 into frictional engagement with the underside of upper track 18. It will thus be apparent that the cam 58 operates the friction shoe 40 to lock the tracks of the seat adjuster from movement relative one another. The friction lining 44 may be of rubber or plastic or a similar material suitable for a friction lining.

A spring 64 is connected in tension between an apertured tab 66 of handle 62 and an apertured tab 68 of the angle member 26. The spring 64 is arranged to go overcenter upon movement of the lever 62 from its position of FIG. 1 to assist in moving the cam 58 to release the friction lock to permit fore and aft adjusting movement.

When the vehicle is impacted, the inertia of the seat 10 and the passenger seated thereon may overcome the frictional engagement between the friction shoe 40 and the track 18 to permit movement of the seat 10 as limited by the stop 36 or 38 to absorb the impact energy. The underside of upper track 18 may be knurled to provide teeth or the equivalent at 70 to shear the friction lining 44 upon energy absorbing movement of the seat to enhance the energy absorption.

Thus it is seen that an improved energy absorbing seat adjuster is provided.

What is claimed is:

1. An energy absorbing device for adjustably mounting a seat in a vehicle body comprising: a first track member attached to the vehicle seat, a second track member attached to the vehicle body, the first and second track members being slidably interengaged to permit longitudinal fore and aft movement of the seat relative the vehicle body, means limiting vertical movement between the first and second track members, a friction shoe including a backing plate and a shearable friction lining mounted on the backing plate, means mounting the friction shoe on one of the track members to permit vertical movement of the friction shoe to frictionally engage the friction lining with the other track member while preventing longitudinal movement of the friction shoe relative the one track member, teeth means on the other track member being engaged by the friction lining, occupant actuable cam means effective to forcibly move the friction shoe vertically to frictionally engage the friction lining with the teeth means of the other track member to selectively lock the track members from movement relative one another and unlock the track member to permit fore and aft adjusting movement of the seat relative the vehicle body, the frictional engagement of the friction lining of the friction shoe against the teeth means of the other track member being overcome by kinetic impact energy to permit longitudinal movement between the track members and forced sliding of the friction lining against the other track member and shearing of the friction lining by the teeth means to absorb the kinetic impact energy.

* * * * *